(12) United States Patent
Sakakibara

(10) Patent No.: US 10,647,035 B2
(45) Date of Patent: May 12, 2020

(54) VEHICLE SEAT MEMBER AND VEHICLE SEAT

(71) Applicant: SEKISUI PLASTICS CO., LTD., Osaka (JP)

(72) Inventor: Yushi Sakakibara, Nara (JP)

(73) Assignee: Sekisui Plastics Co., Ltd., Osaka-shi (JP)

(*) Notice: Subject to any disclaimer, the term of this patent is extended or adjusted under 35 U.S.C. 154(b) by 0 days.

(21) Appl. No.: 15/780,895

(22) PCT Filed: Nov. 28, 2016

(86) PCT No.: PCT/JP2016/085175
§ 371 (c)(1),
(2) Date: Jun. 1, 2018

(87) PCT Pub. No.: WO2017/094659
PCT Pub. Date: Jun. 8, 2017

(65) Prior Publication Data
US 2018/0345545 A1 Dec. 6, 2018

(30) Foreign Application Priority Data
Dec. 2, 2015 (JP) .................................. 2015-235673

(51) Int. Cl.
*B29C 44/12* (2006.01)
*B29C 37/00* (2006.01)
(Continued)

(52) U.S. Cl.
CPC ........ *B29C 44/1214* (2013.01); *B29C 37/005* (2013.01); *B29C 44/1233* (2013.01);
(Continued)

(58) Field of Classification Search
CPC .............................. B29C 44/1214; B60N 2/90
See application file for complete search history.

(56) References Cited

U.S. PATENT DOCUMENTS

| 6,571,411 B1 | 6/2003 | Ebe |
| 8,408,655 B2 * | 4/2013 | Ellison ................... B60N 2/015 297/452.18 |
| 2009/0227913 A1 * | 9/2009 | Moriyama ............... B60N 2/90 601/49 |

(Continued)

FOREIGN PATENT DOCUMENTS

| JP | 59-164541 | 11/1984 |
| JP | 2591763 | 3/1999 |

(Continued)

OTHER PUBLICATIONS

Official Communication issued in International Patent Application No. PCT/JP2016/085175, dated Feb. 14, 2017, along with an English translation thereof.

(Continued)

*Primary Examiner* — David R Dunn
*Assistant Examiner* — Tania Abraham
(74) *Attorney, Agent, or Firm* — Locke Lord LLP

(57) ABSTRACT

Provided are a vehicle seat member in which even when a foamed resin molded body forming the vehicle seat member shrinks after being demolded, influence of the shrinkage behavior on a frame member embedded in the foamed resin molded body can be prevented, and thus a change in the position of a protrusion, which serves as a part to be anchored to a vehicle body, of the frame member can be prevented, whereby the vehicle seat member can be attached to the vehicle body side easily and reliably, and a vehicle seat including such a vehicle seat member. A vehicle seat member includes a foamed resin molded body and a frame member integrally formed therewith, the frame member including a body portion embedded in the foamed resin molded body and protrusions each protruding from the body portion and having a tip end protruding outward from the foamed resin molded body.

14 Claims, 5 Drawing Sheets

(51) Int. Cl.
  *B60N 2/70* (2006.01)
  *B60N 2/90* (2018.01)
  *B60N 2/015* (2006.01)
  *B60N 2/68* (2006.01)
  *B29K 25/00* (2006.01)
  *B29L 31/58* (2006.01)

(52) U.S. Cl.
  CPC .......... *B29C 44/1271* (2013.01); *B60N 2/015* (2013.01); *B60N 2/7017* (2013.01); *B60N 2/90* (2018.02); *B29K 2025/06* (2013.01); *B29L 2031/58* (2013.01); *B60N 2/68* (2013.01)

(56) References Cited

U.S. PATENT DOCUMENTS

2010/0133891 A1   6/2010   Onoda et al.
2013/0257133 A1*  10/2013  Reedy ..................... B60N 2/68
                                                   297/452.38
2017/0057130 A1    3/2017  Sameshima et al.

FOREIGN PATENT DOCUMENTS

| JP | 2001-161508 | 6/2001 |
| JP | 2010-105304 | 5/2010 |
| JP | 2011-16458  | 1/2011 |
| JP | 5344395     | 11/2013 |
| WO | 2015/159691 | 10/2015 |

OTHER PUBLICATIONS

Office Action dated Nov. 5, 2018, issued for the Chinese patent application No. 201680069225.X.

\* cited by examiner

VEHICLE SEAT MEMBER AND VEHICLE SEAT

TECHNICAL FIELD

The present invention relates to a vehicle seat member and a vehicle seat.

BACKGROUND ART

As a vehicle seat for automobiles and the like, a vehicle seat is known that includes at least a vehicle seat member having a foamed resin molded body and a frame member integrally molded therewith, the frame member including a body portion and a protrusion, the body portion being embedded in the foamed resin molded body, and the protrusion protruding from the body portion and having a tip end that protrudes outward from the foamed resin molded body. In addition, another vehicle seat is known that further includes an upper seat member stacked on such a vehicle seat member, the upper seat member being made of a cushion material that elastically deforms when a load is applied thereto, and the compressive strength of the vehicle seat member being greater than that of the upper seat member.

Patent Literature 1 and Patent Literature 2 each describe a vehicle seat with the aforementioned configuration that further has a recessed groove or a cutout, which has a shape complementary to the shape of a frame member, formed on the rear surface side of the vehicle seat member so that the frame member is fixedly inserted into the recessed groove or the cutout. In the vehicle seat with such a configuration, it is difficult to firmly fix the position of the frame member on the vehicle seat member, and thus there may be cases where a positional deviation occurs or abnormal noise occurs due to a positional deviation. Further, due to such a positional deviation, it often becomes difficult to fix the vehicle seat on the vehicle body side.

As a vehicle seat that can solve such inconveniences, Patent Literature 3 and Patent Literature 4 each describe a vehicle seat with a configuration in which a frame member is integrally molded with a vehicle seat member during molding. The vehicle seat with such a configuration is advantageous in that since the frame member is integrally molded within the vehicle seat member, which is a foamed resin molded body, a positional deviation of the frame member within the vehicle seat member can be avoided.

CITATION LIST

Patent Literature

Patent Literature 1: JP 2591763 U
Patent Literature 2: JP 5344395 B
Patent Literature 3: JP 2001-161508 A
Patent Literature 4: WO 2015/159691 A

SUMMARY OF INVENTION

Technical Problem

The vehicle seat with the configuration described in Patent Literature 3 or Patent Literature 4 is advantageous in that a positional deviation of the frame member is unlikely to occur since the frame member is integrally molded within the foamed resin molded body forming the vehicle seat member. However, usually, the foamed resin molded body has a property of shrinking slightly after being demolded, and thus the frame member, which is usually a wire, will unavoidably deform along with the shrinkage of the foamed resin molded body, though the amount of the deformation is very small. Due to such deformation, the position of the aforementioned protrusion that serves as a part to be anchored to the vehicle body will slightly change from its initial position. Since high dimensional accuracy is required of the current vehicles, in particular, automobiles, eliminating a change in the position of the protrusion that occurs after foam molding would be desirable to enhance the assembly accuracy.

The present invention has been made in view of the foregoing, and it is an object of the present invention to provide a vehicle seat member including a foamed resin molded body and a frame member integrally molded therewith, the frame member having a body portion and a protrusion, the body portion being embedded in the foamed resin molded body, and the protrusion protruding from the body portion and having a tip end that protrudes outward from the foamed resin molded body, in which even when the foamed resin molded body forming the vehicle seat member shrinks after being demolded, the influence of the shrinkage behavior on the protrusion can be reduced, so that a change in the position of the protrusion, which serves as a part to be anchored to a vehicle body, formed on the frame member can be eliminated or minimized, whereby the vehicle seat member can be attached to the vehicle body side easily and reliably. It is another object of the present invention to provide a vehicle seat including such a vehicle seat member.

Solution to Problem

A vehicle seat member in accordance with the present invention is a vehicle seat member including a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body, in which foamed resin of the foamed resin molded body is punched around a region where the protrusion is located.

The term "punched" herein means a state in which a part of the foamed resin molded body does not exist. Such a punched portion may be formed concurrently with the integral molding performed using a mold, or by artificially removing a part of the foamed resin molded body after the molding is performed.

As shown in the examples described below, in the vehicle seat member in accordance with the present invention, as the foamed resin of the foamed resin molded body is punched (removed) around a region where the protrusion is located, the amount of change in the position of the protrusion can be reduced in comparison with when punching is not performed. Accordingly, it is possible to maintain high positional accuracy of the protrusion, and thus attach the vehicle seat member to a vehicle body with high accuracy. The phase "around a region . . . " as referred to in the present invention means a region around the protrusion.

This is because typically, in a vehicle seat member formed through in-mold integral molding, a protrusion, which protrudes downward or laterally from an embedded body portion of a frame is in contact at a large area with a foamed resin molded body forming the vehicle seat member, and therefore, the protrusion is more susceptible to the influence of the shrinkage of the foamed resin molded body than is the body portion of the frame. However, in the vehicle seat member in accordance with the present invention, since the foamed resin is punched around a region where the protrusion is located in the foamed resin molded body, the protrusion can be prevented from being directly influenced by the shrinkage of the foamed resin molded body, and accordingly, it is speculated that a change in the position of the protrusion does not occur, or can be minimized even if it occurs.

In an aspect of the vehicle seat member in accordance with the present invention, the foamed resin molded body is substantially rectangular in shape in plan view, and a part of the body portion of the frame member includes a portion lying along the longer-side direction of the foamed resin molded body, and further, the protrusion is formed on the portion lying along the longer-side direction of the body portion. When a foamed resin molded body is a rectangular parallelepiped, which is substantially rectangular in shape in plan view, the amount of shrinkage of the molded body is greater in the longer-side direction than in the shorter-side direction. Therefore, the operational advantage of the present invention can be achieved even more reliably in a vehicle seat with a configuration in which the aforementioned protrusion is formed on the portion of the body portion lying along the longer-side direction in which the amount of shrinkage is greater than that in the shorter-side direction.

Herein, the body portion may include only a longer-side portion, but in a more preferred aspect of the vehicle seat member in accordance with the present invention, the body portion also includes a shorter-side portion connected to the longer-side portion and lying along the shorter-side direction of the foamed resin molded body. According to such an aspect, as the body portion also includes a shorter-side portion, the longer-side portion of the body portion is restrained by the foamed resin molded body. Therefore, it is susceptible to the influence of the shrinkage along the longer-side direction of the foamed resin molded body. According to the present aspect, even in such a case, the position of the protrusion can be maintained with high accuracy since a space formed by partially punching the foamed resin is provided around a region where the protrusion is located.

According to a more preferred aspect of the vehicle seat member in accordance with the present invention in which the body portion includes a shorter-side portion, the body portion includes a pair of opposite longer-side portions and a pair of shorter-side portions connected to opposite sides of the respective longer-side portions and is formed such that the pair of longer-side portions and the pair of shorter-side portions surround an inner portion of the foamed resin molded body along an inner side of the contour of the foamed resin molded body in plan view, and at least one of the longer-side portions has the protrusion formed thereon.

According to such an aspect, as the body portion of the frame member surrounds the inner portion of the foamed resin molded body along the inner side of the contour of the foamed resin molded body, the rigidity of the vehicle seat member can be enhanced. Further, according to such an aspect, since the shorter-side portion of the body portion is also restrained by the foamed resin, the protrusion formed on the longer-side portion is also susceptible to the influence of the shrinkage of the foamed resin molded body along the shorter-side direction. However, even in such a case, since a space formed by partially punching the foamed resin is provided around a region where the protrusion is located, it follows that a gap is formed around the protrusion also in the shorter-side direction. Accordingly, the position of the protrusion in the shorter-side direction can be maintained with high accuracy.

In the vehicle seat member in accordance with the present invention, the size of the punched region can be experimentally set to an optimal value taking into consideration the shrinkage factor of the foamable resin material forming the vehicle seat member. If the region is too small, the foamable resin material may collide with the protrusion upon shrinkage of the foamable resin material, and the position of the protrusion can move due to such collision. If the punched portion is too large, the strength of the seat member becomes partially weak, and thus the seat member can become damaged. Therefore, in a preferred aspect of the vehicle seat member in accordance with the present invention, the punched region is provided in the range of 1 to 25 mm around the protrusion. With such a range, expected performance can be fully achieved when the foamed resin molded body forming the vehicle seat member is a molded body of foamable polystyrene resin, a molded body of foamable composite resin including polystyrene resin and polyolefin resin, or a molded body of foamable polyolefin resin.

A vehicle seat in accordance with the present invention includes the aforementioned vehicle seat member and an upper seat member provided above the vehicle seat member, in which the upper seat member is made of a cushion material that elastically deforms when a load is applied thereto, and the vehicle seat member is made of a foamed resin molded body with greater compressive strength than that of the upper seat member. In such an aspect, the material of the upper seat member is not limited, but is preferably soft polyurethane foam, and the foamed resin molded body forming the vehicle seat member is not limited, either, but is preferably a molded body of foamable polystyrene, a molded body of foamable composite resin including polystyrene resin and polyolefin resin, or a molded body of foamable polyolefin resin.

In the vehicle seat with such a configuration, the upper seat member can provide a comfortable sense of elasticity to a seated person, and the vehicle seat member can prevent the deformation of the vehicle seat to a level more than necessary. Therefore, a vehicle seat that is both comfortable and safe can be provided.

Advantageous Effects of Invention

According to the present invention, in a vehicle seat member including a foamed resin molded body and a frame member integrally embedded therein, a change in the position of a protrusion, which serves as a part to be anchored to a vehicle body, formed on the frame member from its initial position due to shrinkage of the foamed resin molded body can be eliminated or minimized. Accordingly, a vehicle seat member and a vehicle seat are provided that fully satisfy high attachment accuracy with respect to a vehicle body side that has been required in recent years.

DESCRIPTION OF EMBODIMENTS

Hereinafter, an embodiment of a vehicle seat member and a vehicle seat in accordance with the present invention will be described with reference to the drawings.

Figure 1:
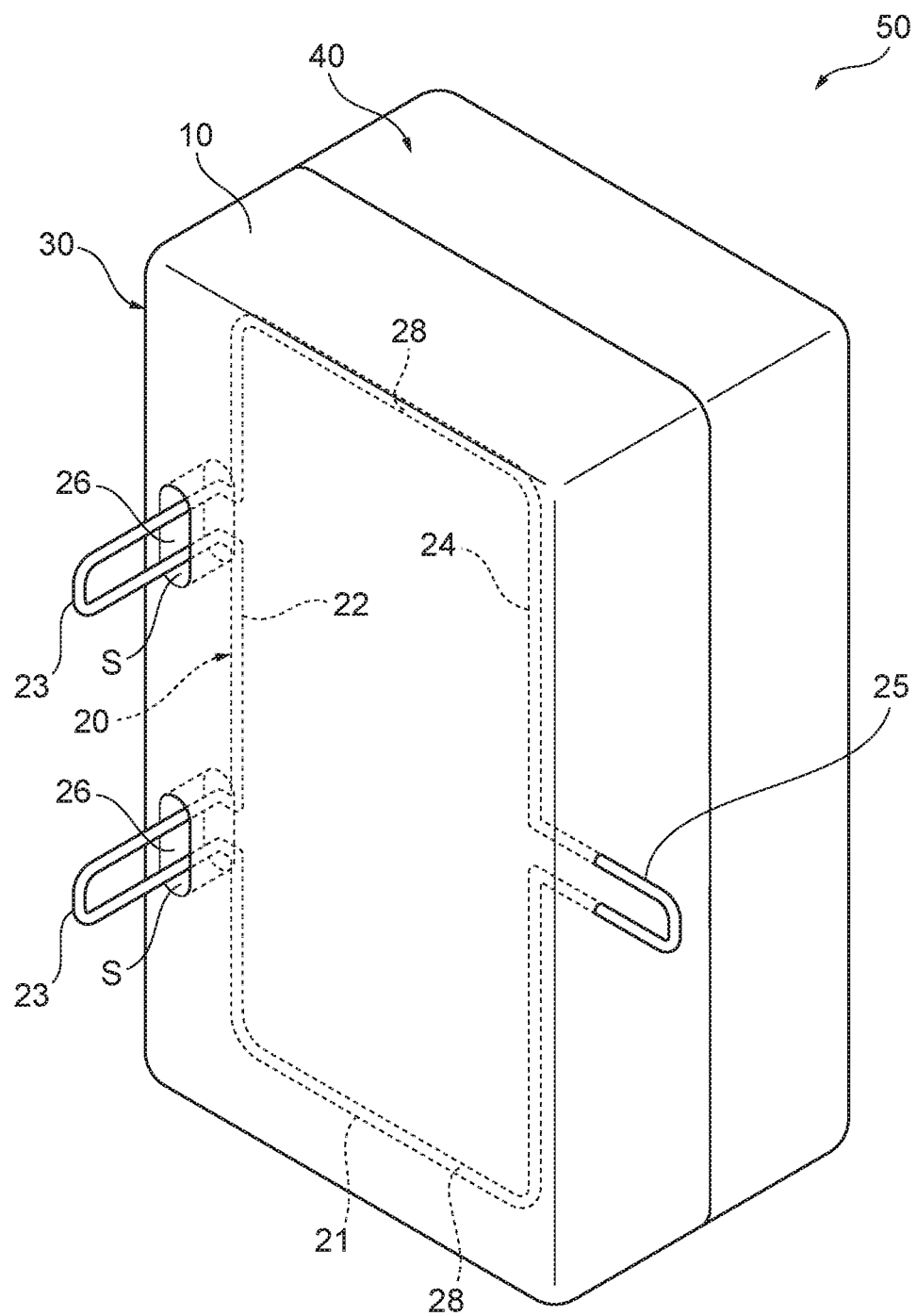
FIG. 1 is a perspective view illustrating an embodiment of a vehicle seat in accordance with the present invention.

As illustrated in FIG. 1, a vehicle seat 50 has, as a basic configuration, a vehicle seat member 30 including a foamed resin molded body 10 and a frame member 20 embedded therein through integral molding. The overall shape of the vehicle seat member 30 is not particularly limited, but is typically a cubic shape that is substantially rectangular in shape in plan view. Needless to say, the shape in plan view as well as the thickness of the foamed resin molded body 10 can change variously in accordance with the shape of the vehicle body side to which the vehicle seat 50 is adapted to be attached.

The foamed resin molded body 10 is an in-mold foam molded body of foamable resin. The type of the foamable resin used is not particularly limited, but is preferably foamable polystyrene resin, foamable composite resin including polystyrene resin and polyolefin resin, foamable polyolefin resin, or the like. The expansion ratio of the foamable resin differs depending on the material used, but is typically about 10 to 50 times, or more preferably, about 20 to 40 times.

The frame member 20 is adapted to be embedded in the foamed resin molded body 10 so as to provide required shape retention and strength thereto. Typically, a steel wire with a diameter of about 3 to 6 mm is used, but a plate-like steel material may also be used. The frame member 20 includes, as illustrated in the drawing, a body portion 21 embedded in a portion slightly recessed inward from the outer peripheral surface of the foamed resin molded body 10 along the outer periphery thereof, and two first protrusions 23, 23 each formed of a longer-side portion 22 that lies along a side surface of the body portion 21 in the longer-side direction of the foamed resin molded body 10. Though not necessary, a second protrusion 25 is also formed on a longer-side portion 24 of the body portion 21 that lies along another side surface of the foamed resin molded body 10 in the longer-side direction in the example illustrated in the drawing.

Figure 2:
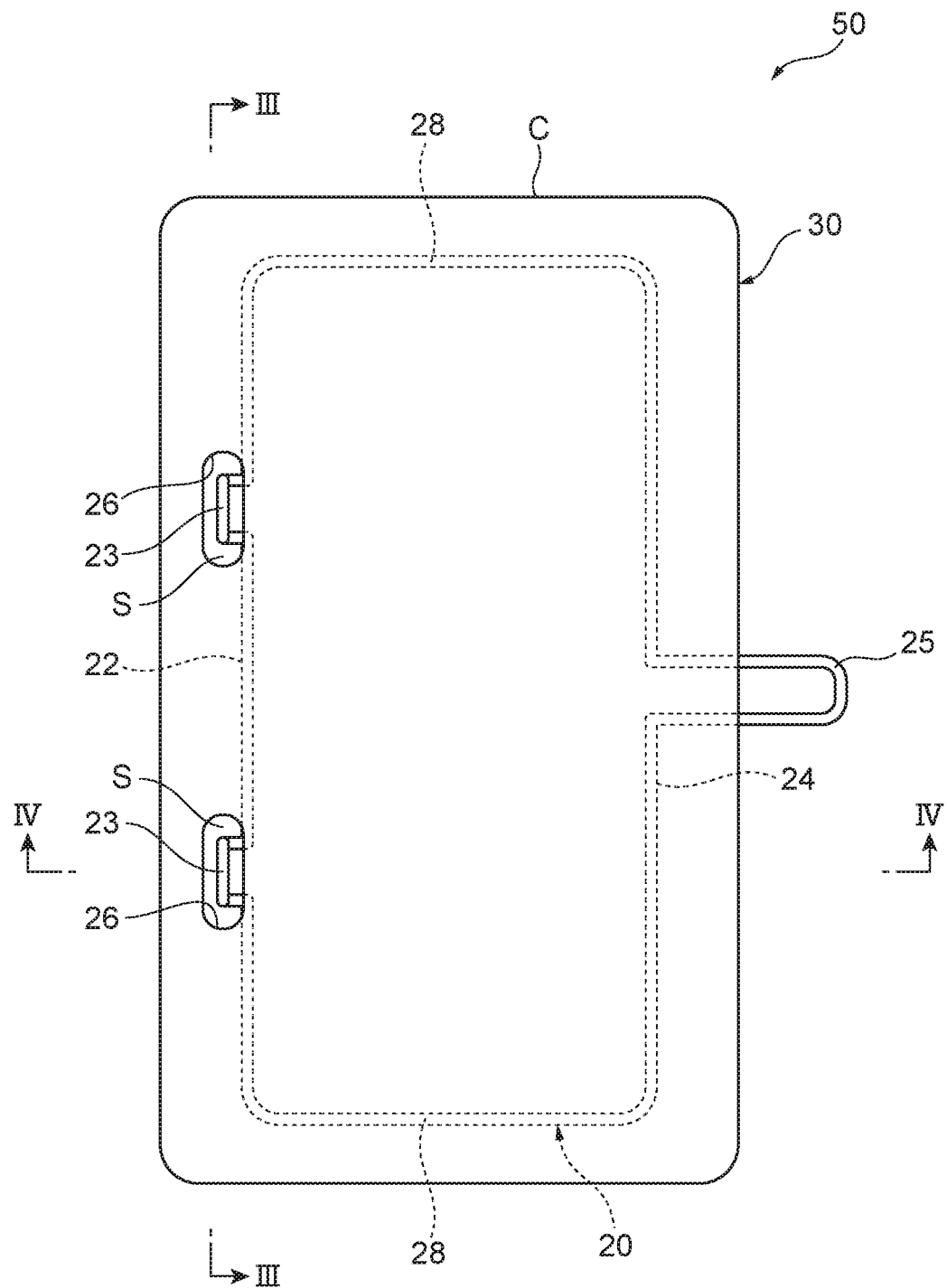
FIG. 2 is a view of the vehicle seat illustrated in FIG. 1 seen from the bottom surface side.

Herein, the body portion 21 of the frame member 20 may include shorter-side portions 28, 28 that lie along side surfaces of the foamed resin molded body 10 in the shorter-side direction and are connected to the longer-side portions 22, 24. More preferably, the shorter-side portions 28, 28 are connected to opposite sides of the longer-side portion 22. As a further preferable configuration, as illustrated in FIG. 2, the body portion 21 may be formed such that it surrounds, with the pair of opposite longer-side portions 22, 24 and the pair of shorter-side portions 28, 28 connected to opposite sides of the respective longer-side portions 22, 24, the inner portion of the foamed resin molded body 10 along the inner side of the contour C of the foamed resin molded body 10 in plan view. Accordingly, the rigidity of the vehicle seat member 30 can be enhanced. With the frame member 20 surrounding the inner portion of the foamed resin molded body 10, a continuous loop may be formed in the foamed resin molded body 10.

Each first protrusion 23 protrudes in the thickness direction of the foamed resin molded body 10, and a tip end thereof protrudes outward from the rear surface side of the foamed resin molded body 10. In addition, the second protrusion 25 protrudes in the plane direction of the foamed resin molded body 10, and a tip end thereof protrudes outward from a side surface side of the foamed resin molded body 10. In the example illustrated in the drawing, the first protrusions 23 and the second protrusion 25 are each formed by bending a steel wire, which forms the body portion 21, in an approximately U-shape, but may also be formed by integrating an approximately U-shaped protrusion, which has been prepared separately, with the body portion 21 through welding or the like. Alternatively, though not illustrated, a metal or resin plate may be arranged at a corner and the plate may be integrally connected with a steel wire. Further, such a plate may have the first protrusions 23, 23 arranged thereon in an upright position.

The position where each of the first protrusions 23, 23 is formed is determined in accordance with the position of a mounting jig on the body side of an automobile on which the vehicle seat 50 is adapted to be mounted. Typically, the position may be a position close to one of the opposite ends of the longer-side portion 22 of the body portion 21 along a side surface of the foamed resin molded body 10 in the longer-side direction.

In the vehicle seat member 30 in accordance with the present invention, regions 26 each obtained by partially punching (removing) the foamed resin forming the foamed resin molded body 10 to a required depth in an elliptical shape in plan view are formed in surrounding regions (around regions) of the first protrusions 23, 23 that protrude from the body portion 21 of the frame member 20 embedded in the foamed resin molded body 10 (that is, arranged on the body portion 21 in an upright position toward the rear surface side of the foamed resin molded body 10). Preferably, the foamed resin is punched in a region of about 1 to 25 mm around the first protrusion 23. More preferably, the foamed resin is punched in a region of about 1 to 18 mm around the first protrusion 23. Further preferably, the foamed resin is punched in a region of about 2 to 10 mm around the first protrusion 23. The depth of the punched portion is preferably such that the body portion 21 of the frame member 20 is almost reached as illustrated in a cross-sectional view of FIG. 3.

Figure 3:
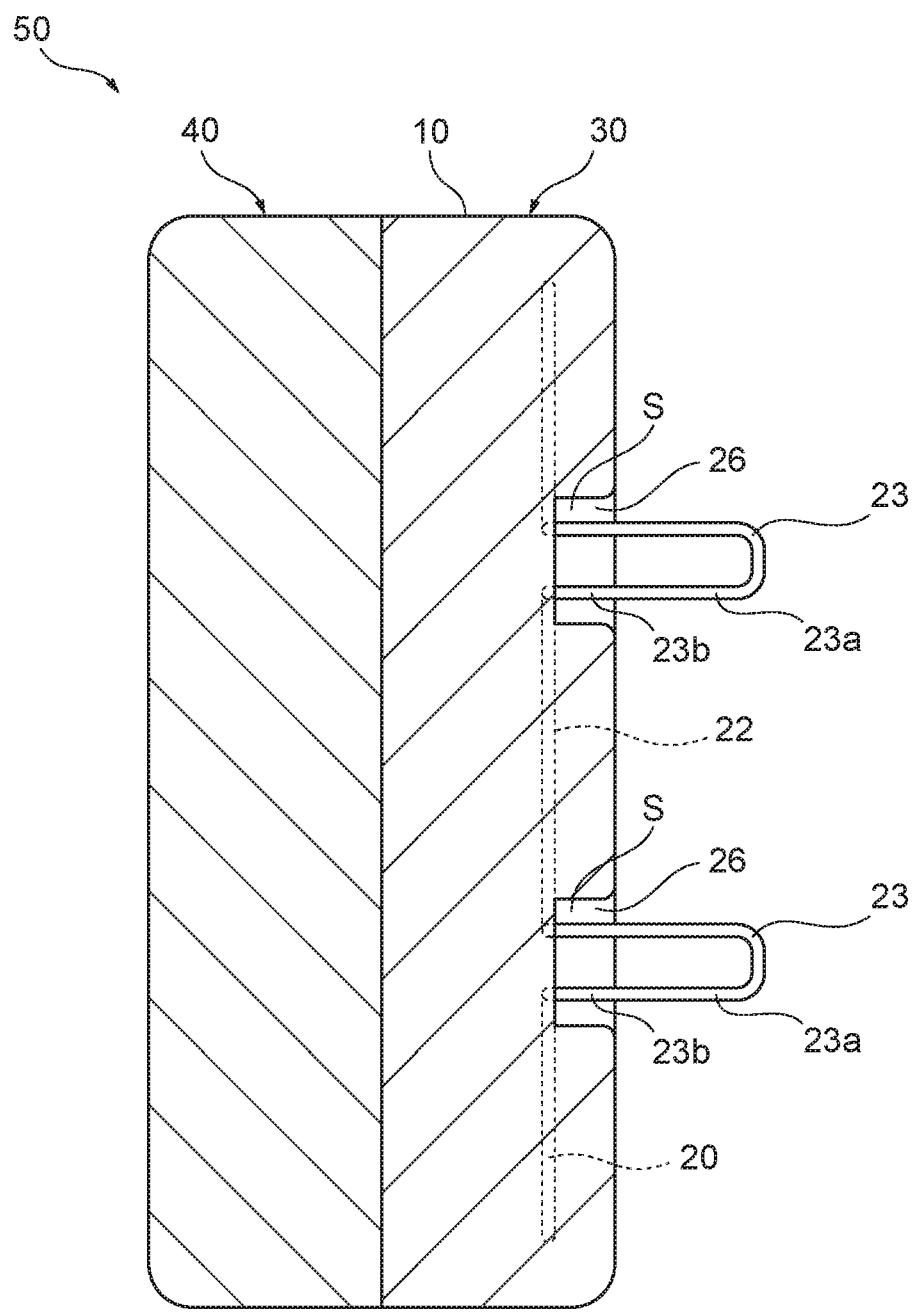
FIG. 3 is a cross-sectional view along line III-III of FIG. 2.
Figure 4:
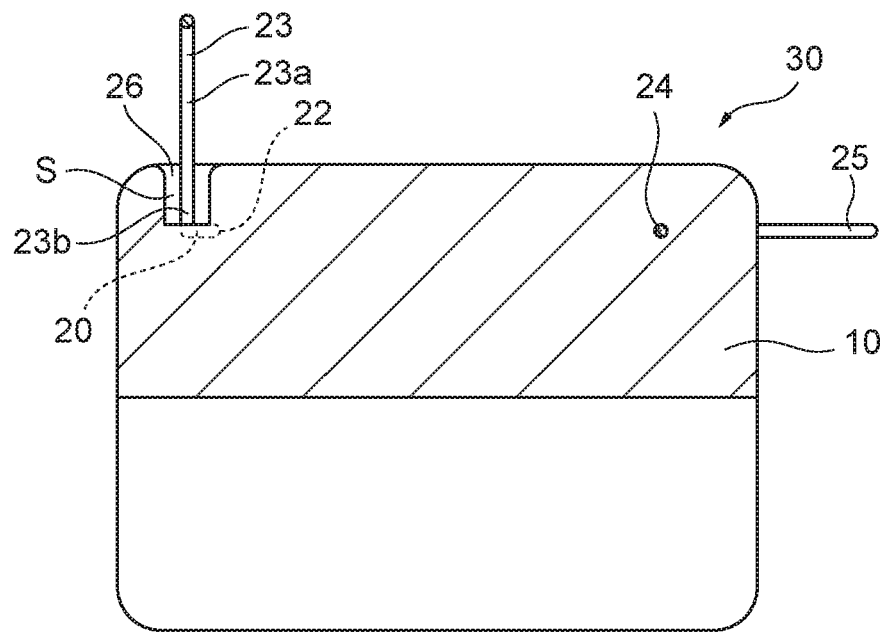
FIG. 4 is a cross-sectional view along line IV-IV of FIG. 2.

As illustrated in FIGS. 3 and 4, as described above, for each of the first protrusions 23, 23 protruding from the body portion 21 of the frame member 20 of the vehicle seat member 30, a region surrounding a portion 23b other than a portion 23a protruding from the foamed resin molded body 10 (from the rear surface thereof) is formed as a punched space S. That is, spaces S are formed in part of the foamed resin molded body 10 adjacent to the first protrusions 23, 23 through punching so that the first protrusions 23, 23 do not contact the foamed resin molded body 10. Such spaces S can provide, in addition to the advantageous effects described below, backlash margins for the deformation of the first protrusions 23, 23 when the vehicle seat 50 is attached to a vehicle.

More specifically, spaces S with sizes that can ensure a con-contact state of the first protrusions 23, 23 with the foamed resin molded body 10 even when the foamed resin molded body 10 thermally expands or thermal shrinks are formed in the foamed resin molded body 10. Consequently, the direct influence of a dimensional change of the foamed resin molded body 10 due to heat on the first protrusions 23, 23 can be suppressed.

With the aforementioned configuration, the frame member 20 is arranged in a mold such that the tip ends of the first and second protrusions 23, 25 protrude from the mold, and enclosures are provided around the first protrusions 23, 23 so that foamable resin does not enter therein, and in such a state, the mold is filled with foamable resin so that in-mold foam molding is performed. Then, upon termination of the foam molding, the resulting molded body is demolded so that as illustrated in the drawing, a vehicle seat member 30 can be obtained in which the frame member 20 is integrally embedded within the foamed resin molded body 10, the tip end sides of the first protrusions 23, 23 and the second protrusion 25 protrude to the outside of the foamed resin molded body 10, and punched regions 26 having no foamed resin therein are formed around the first protrusions 23, 23.

The foamed resin molded body 10 shrinks after it is demolded. However, since there is no foamed resin around the first protrusions 23, 23, the influence of the shrinkage on the first protrusions 23, 23 can be eliminated. Consequently, the first protrusions 23, 23 can be maintained at their initial positions with almost no changes even when the foamed resin molded body 10 shrinks.

In this embodiment, since the body portion 21 has the shorter-side portions 28 connected to the opposite sides of the longer-side portion 22, the opposite sides of the longer-side portion 22 of the body portion 21 are restrained by the foamed resin molded body 10. Therefore, the longer-side portion 22 is susceptible to the influence of the shrinkage of the foamed resin molded body 10 in the longer-side direction. However, even in such a case, since the spaces S, which have been formed by partially punching the foamed resin, are provided around regions of the first protrusions 23, 23, the positions of the first protrusions 23, 23 can be maintained with high accuracy.

Further, since the opposite sides of the shorter-side portions 28 of the body portion 21 are also restrained by the foamed resin of the foamed resin molded body 10, the first protrusions 23, 23 formed on the longer-side portion 22 are also susceptible to the influence of the shrinkage of the foamed resin molded body 10 along the shorter-side direction. However, even in such a case, since the spaces S, which have been formed by partially punching the foamed resin, are provided around regions of the first protrusions 23, 23, it follows that gaps are formed around the first protrusions 23, 23 also in the shorter-side direction. Accordingly, the positions of the first protrusions 23, 23 in the shorter-side direction can be maintained with high accuracy.

It should be noted that the vehicle seat 50 illustrated in the drawing further includes an upper seat member 40 provided above the vehicle seat member 30. The upper seat member 40 is formed of a cushion material that elastically deforms when a load is applied thereto, and the vehicle seat member 30 is formed of a foamed resin molded body with higher compressive strength than that of the upper seat member 40. Examples of the cushion material forming the upper seat member 40 include soft polyurethane-based foam. In such a case, the foamed resin molded body forming the vehicle seat member 30 is preferably a molded body of foamable polystyrene resin, a molded body of foamable composite resin including polystyrene resin and polyolefin resin, or a molded body of foamable polyolefin resin, as described above. With the vehicle seat 50 with such a configuration, the upper seat member 40 can provide a comfortable sense of elasticity to a seated person, and the vehicle seat member 30 can prevent the deformation of the vehicle seat 50 to a level more than necessary. In addition, though not illustrated, the vehicle seat 50 is covered with an appropriate cover material when actually used.

EXAMPLES

Hereinafter, advantages of the vehicle seat 50 in accordance with the present invention will be verified by means of examples and comparative examples.

Example 1

A vehicle seat member 30 with the configuration illustrated in the embodiment was produced through in-mold foam molding. The widths in the longer-side direction and the shorter-side direction of the vehicle seat member 30 were set to 1260 mm and 550 mm, respectively, and the thickness was set to 160 mm. Foamable composite resin including polystyrene resin and polyolefin resin (Piocelan (registered trademark): OP-30EU, produced by SEKISUI PLASTICS CO., Ltd.) was used as the foamable resin, and the expansion rate was set to 30 times. An iron wire (SWM-B) with a diameter of 4.5 mm was used as the frame member 20. It should be noted that the shrinkage factor of Piocelan is about 8/1000.

The iron wire was arranged around the entire periphery of the foamed resin molded body 10 at a position recessed inward from a peripheral side surface of the foamed resin molded body 10 by 30 mm, in almost the middle portion of the foamed resin molded body 10 forming the vehicle seat member 30 in the thickness direction. Two first protrusions 23, 23 were formed on the longer-side portion 22 of the body portion 21 along a side surface of the foamed resin molded body 10 in the longer-side direction, at a distance of 700 mm between the vertices of the two first protrusions 23, 23. In addition, a second protrusion 25 was also formed on the central portion of the longer-side portion 24 of the body portion 21 along another side surface of the foamed resin molded body 10 in the longer-side direction.

Figure 5:
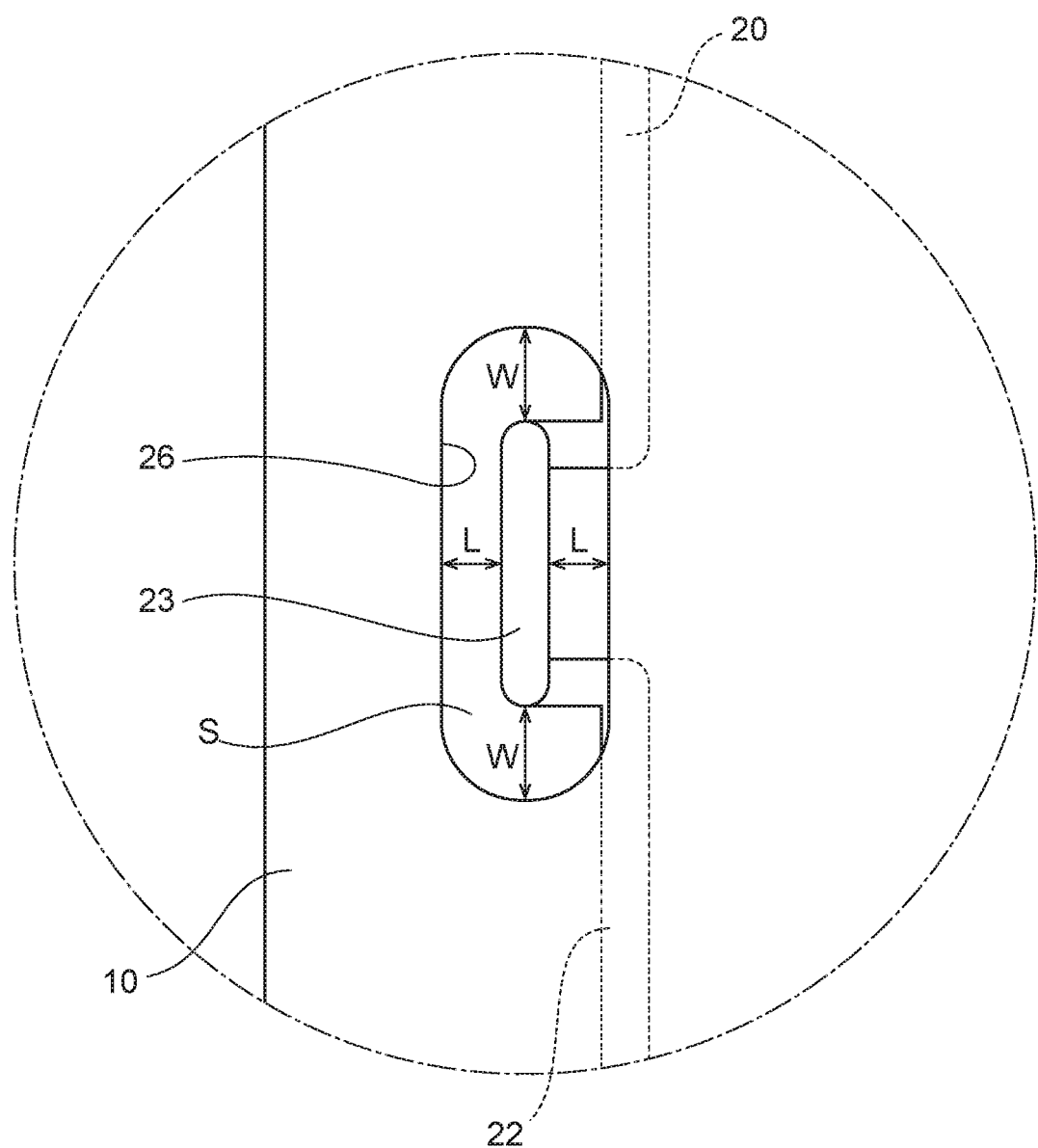
FIG. 5 is an enlarged view of a punched portion.

Some means was applied to the mold to perform in-mold foam molding so that, as illustrated in an enlarged view of FIG. 5, a punched portion 26, which has a clearance of 6 mm on each side of the first protrusion 23 in the longer-side direction W of FIG. 5, and has a clearance of 3 mm on each side of the first protrusion 23 in the shorter-side direction L of FIG. 5, was formed around each of the two first protrusions 23, 23. After the obtained molded body was demolded and 24 hours elapsed, the distance between the vertices of the two first protrusions 23, 23 was measured. Then, the distance was found to be 699.5 mm, and the amount of change in the position was found to be 0.5 mm.

Comparative Example 1

Some means was applied to the mold, and a vehicle seat member 30 was obtained by filling the entire regions around the first protrusions 23, 23 with foamable resin, that is, providing no regions for punched portions. The configuration of the vehicle seat member 30 except this point is the same as that in Example 1. After the obtained molded body was demolded and 24 hours elapsed, the distance between the vertices of the two first protrusions 23, 23 was measured. Then, the distance was found to be 696.5 mm, which is greater than that in Example 1 by 3.0 mm. Thus, it has been confirmed that the two first protrusions 23, 23 have moved in the direction of approaching each other.

Example 2

Foamable polystyrene resin (ESLEN beads: FDK-40LV, produced by SEKISUI PLASTICS CO., Ltd.) was used as the foamable resin, and the expansion rate was set to 40 times. Then, as illustrated in the enlarged view of FIG. 5, a punched portion 26, which has a clearance of 4 mm on each side of the first protrusion 23 in the longer-side direction W of FIG. 5, and has a clearance of 2 mm on each side of the first protrusion 23 in the shorter-side direction L of FIG. 5, was formed. The other conditions were set the same as those in Example 1 to obtain a vehicle seat member 30. After the obtained molded body was demolded and 24 hours elapsed, the distance between the vertices of the two first protrusions 23, 23 was measured. Then, the distance was found to be 699.5 mm, and the amount of change in the position was found to be 0.5 mm. It should be noted that the shrinkage factor of the foamable polystyrene resin used is about 3/1000.

Comparative Example 2

Some means was applied to the mold, and a vehicle seat member 30 was obtained by filling the entire regions around the first protrusions 23, 23 with foamable resin, that is, providing no regions for punched portions. The configuration of the vehicle seat member 30 except this point is the same as that in Example 2. After the obtained molded body was demolded and 24 hours elapsed, the distance between the vertices of the two first protrusions 23, 23 was measured. Then, the distance was found to be 698.0 mm, which is greater than that in Example 2 by 1.5 mm. Thus, it has been confirmed that the two first protrusions 23, 23 have moved in the direction of approaching each other.

Example 3

Foamable polypropylene resin was used as the foamable resin, and the expansion rate was set to 30 times. Then, as illustrated in the enlarged view of FIG. 5, a punched portion 26, which has a clearance of 18 mm on each side of the first protrusion 23 in the longer-side direction W of FIG. 5, and has a clearance of 10 mm on each side of the first protrusion 23 in the shorter-side direction L of FIG. 5, was formed. The other conditions were set the same as those in Example 1 to obtain a vehicle seat member 30. After the obtained molded body was demolded and 24 hours elapsed, the distance between the vertices of the two first protrusions 23, 23 was measured. Then, the distance was found to be 699.5 mm, and the amount of change in the position was found to be 0.5 mm. It should be noted that the shrinkage factor of the foamable polypropylene resin used is about 18/1000.

Comparative Example 3

Some means was applied to the mold, and a vehicle seat member 30 was obtained by filling the entire regions around the first protrusions 23, 23 with foamable resin, that is, providing no regions for punched portions. The configuration of the vehicle seat member 30 except this point is the same as that in Example 3. After the obtained molded body was demolded and 24 hours elapsed, the distance between the vertices of the two first protrusions 23, 23 was measured. Then, the distance was found to be 694.5 mm, which is greater than that in Example 3 by 5.0 mm. Thus, it has been confirmed that the two first protrusions 23, 23 have moved in the direction of approaching each other.

Consideration

From Examples 1 to 3 and Comparative Examples 1 to 3, it is found that in the vehicle seat member 30 in accordance with the present invention, forming a punched portion around each first protrusion 23, which has been formed on the frame member 20 embedded in the foamed resin molded body 10, can prevent the influence of the shrinkage of the foamed resin molded body 10 on the first protrusion 23.

REFERENCE SIGNS LIST

50 Vehicle seat
40 Upper seat member
30 Vehicle seat member
10 Foamed resin molded body
20 Frame member
21 Body portion of frame member
22 Longer-side portion
23 First protrusion
25 Second protrusion
26 Region obtained by partially punching (removing) foamed resin
28 Shorter-side portion
C Contour
S Space

The invention claimed is:
1. A vehicle seat member comprising:
a foamed resin molded body; and
a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body,
wherein:
foamed resin of the foamed resin molded body is punched around a region where the protrusion is located,
the foamed resin molded body is substantially rectangular in shape,
a part of the body portion of the frame member includes a longer-side portion lying along a longer-side direction of the foamed resin molded body,
the protrusion is formed on the longer-side portion of the body portion and the protrusion protrudes in the thickness direction of the foamed resin molded body,
the body portion includes only a pair of opposite longer-side portions and a pair of shorter-side portions connected to opposite sides of the respective longer-side portions, and the body portion surrounds an inner portion of the foamed resin molded body so that a continuous loop is formed on an inner side of the foamed resin molded body along a contour of the foamed resin molded body.
2. The vehicle seat member according to claim 1, wherein the punched region is provided in a range of 1 to 25 mm around the protrusion.
3. A vehicle seat comprising:
the vehicle seat member according to claim 2; and
an upper seat member provided above the vehicle seat member,
wherein:
the upper seat member is made of a cushion material that elastically deforms when a load is applied thereto, and
the vehicle seat member is made of a foamed resin molded body with greater compressive strength than that of the upper seat member.

4. A vehicle seat comprising:
the vehicle seat member according to claim 1; and
an upper seat member provided above the vehicle seat member,
wherein:
the upper seat member is made of a cushion material that elastically deforms when a load is applied thereto, and
the vehicle seat member is made of a foamed resin molded body with greater compressive strength than that of the upper seat member.

5. The vehicle seat member according to claim 1, wherein the protrusion is perpendicular to the plane direction of the foamed resin molded body.

6. The vehicle seat member according to claim 1, wherein:
the body portion of the frame member includes an exposed portion formed by a punched portion of the foamed resin molded body, and
portions other than the exposed portion of the frame member are all embedded in the foamed resin molded body.

7. The vehicle seat member according to claim 1, wherein the protrusion is formed in a halfway point of the longer-side portion of the body portion.

8. A vehicle seat member comprising:
a foamed resin molded body; and
a frame member integrally molded with the foamed resin molded body, the frame member including a body portion and at least two protrusions, the body portion being embedded in the foamed resin molded body, and the protrusion protruding from the body portion and having a tip end that protrudes outward from the foamed resin molded body,
wherein:
foamed resin of the foamed resin molded body is punched around a region where the protrusion is located,
the foamed resin molded body is substantially rectangular in shape,
a part of the body portion of the frame member includes a longer-side portion lying along a longer-side direction of the foamed resin molded body,
a first protrusion is formed on a first longer-side portion of the body portion and protrudes in the thickness direction of the foamed resin molded body, and a second protrusion formed on a second longer-side portion of the body portion and protrudes in the plane direction of the foamed resin molded body,
the body portion includes only a pair of opposite longer-side portions and a pair of shorter-side portions connected to opposite sides of the respective longer-side portions, and the body portion surrounds an inner portion of the foamed resin molded body so that a continuous loop is formed on an inner side of the foamed resin molded body along a contour of the foamed resin molded body.

9. The vehicle seat member according to claim 8, wherein the punched region is provided in a range of 1 to 25 mm around the protrusion.

10. A vehicle seat comprising:
the vehicle seat member according to claim 9; and
an upper seat member provided above the vehicle seat member,
wherein:
the upper seat member is made of a cushion material that elastically deforms when a load is applied thereto, and
the vehicle seat member is made of a foamed resin molded body with greater compressive strength than that of the upper seat member.

11. A vehicle seat comprising:
the vehicle seat member according to claim 8; and
an upper seat member provided above the vehicle seat member,
wherein:
the upper seat member is made of a cushion material that elastically deforms when a load is applied thereto, and
the vehicle seat member is made of a foamed resin molded body with greater compressive strength than that of the upper seat member.

12. The vehicle seat member according to claim 8, further comprising a third protrusion, wherein the third protrusion is formed on a first longer-side portion of the body portion and protrudes in the thickness direction of the foamed resin molded body.

13. The vehicle seat member according to claim 8, wherein:
the body portion of the frame member includes an exposed portion formed by a punched portion of the foamed resin molded body, and
portions other than the exposed portion of the frame member are all embedded in the foamed resin molded body.

14. The vehicle seat member according to claim 8, wherein the first protrusion and the second protrusion are formed in halfway points of the first longer-side portion and the second longer-side portion of the body portion, respectively.

* * * * *